United States Patent

McCoy et al.

[15] 3,704,454

[45] Nov. 28, 1972

[54] ACCESSING SYSTEM FOR AND IN INTEGRATED CIRCUIT TYPE MEMORIES

[72] Inventors: Michael R. McCoy, San Jose; Terry R. Walther, Sunnyvale, both of Calif.

[73] Assignee: Electronic Arrays, Inc., Mountain View, Calif.

[22] Filed: May 18, 1970

[21] Appl. No.: 38,104

[52] U.S. Cl. ..........................340/173 SP, 340/174 R

[51] Int. Cl. ..........................................G11c 11/34

[58] Field of Search..............................340/173, 174

[56] References Cited

UNITED STATES PATENTS

| | | | |
|---|---|---|---|
| 3,435,138 | 3/1969 | Borhan | 340/173 |
| 3,533,089 | 10/1970 | Wahlstrom | 340/173 |
| 3,365,707 | 1/1968 | Mayhew | 340/173 |
| 3,518,627 | 6/1970 | Meyer | 340/173 |
| 3,440,444 | 4/1969 | Rapp | 340/174 |

*Primary Examiner*—Maynard R. Wilbur
*Assistant Examiner*—Robert F. Gnuse
*Attorney*—Smyth, Roston & Pavitt

[57] ABSTRACT

A read-only memory as MOS device is disclosed, operating with a two phase clock, decoder and decoder drivers using minimum size components. The memory cells are arranged on intersections of gate platings-conductive zone columns. The gate platings are driven by serial connected decoders during one phase, and discharged in the other phase during which column nodes are charged, selectively discharged during first phases in dependence upon further decoder circuitry.

14 Claims, 1 Drawing Figure

PATENTED NOV 28 1972 3,704,454
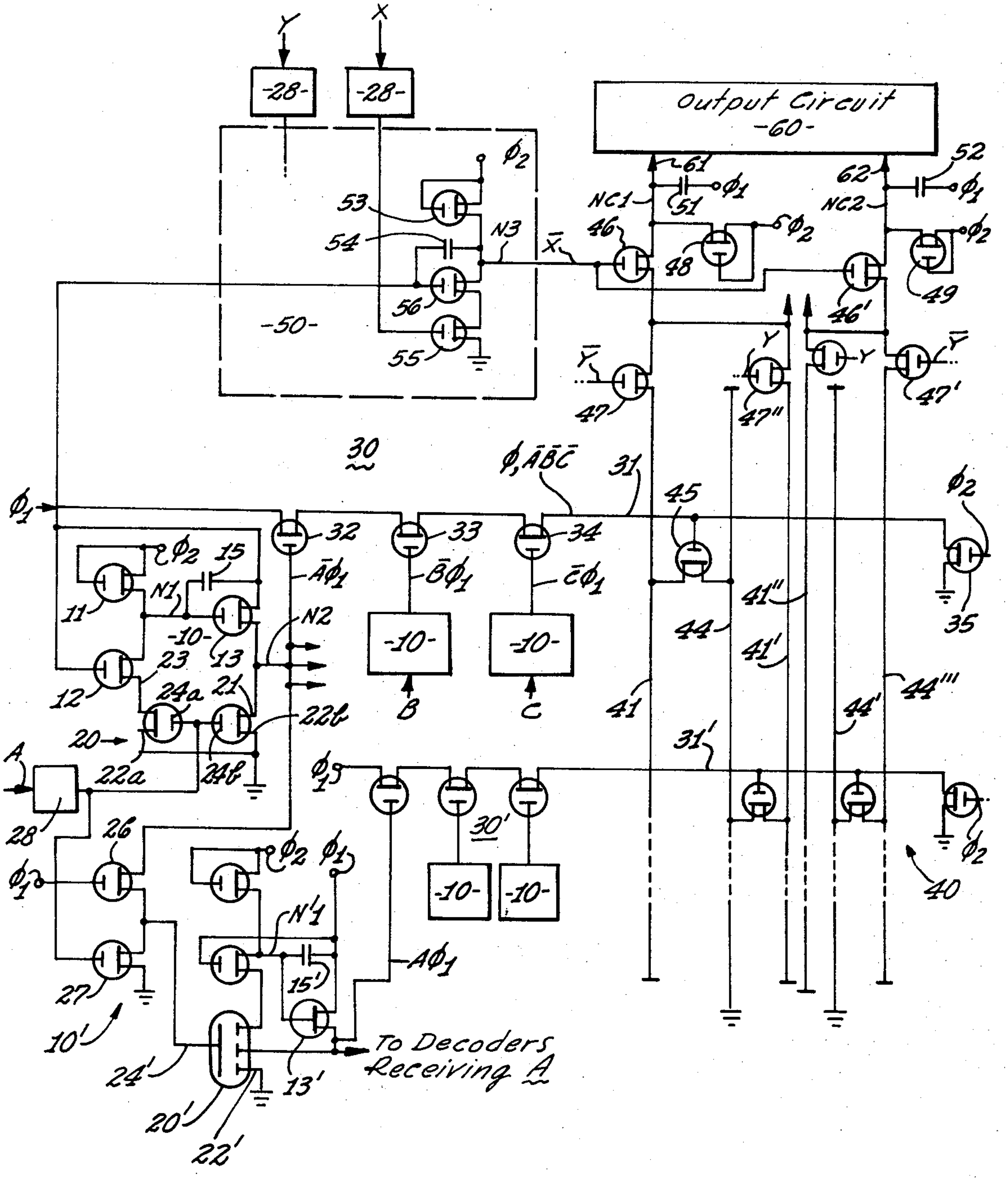
INVENTORS:
Michael R. McCoy
Terry R. Walther
By [signature]
ATTORNEYS

ACCESSING SYSTEM FOR AND IN INTEGRATED CIRCUIT TYPE MEMORIES

The present invention relates to improvements for digital data memories of the integrated circuit type, particularly using insulated gate, field effect operated compoments.

The memory that is the object of the accessing system in accordance with the invention is constructed to be operated by a two phase clock, permitting utilization of minimum size field effect transistors (FET's) without significant d.c. power consumption. Particularly, the address drive, decoder and memory cell elements are operated so that never is there a conductive path between either of two sources of the phase clock signals and the source of substrate, ground or return potential. It is another object of the invention to provide a memory address decode drive circuit using novel field effect transistor structure to further minimize dimensions. It is a further object of the invention to provide a new high access speed, read only, random access memory.

As stated, the memory is constituted on an integrated circuit chip, preferably of the MOS type, whereby memory cells (locations to the bit level) immediate cell accessing control, decoder and decoder drivers are all on the chip. It is a feature of the present invention to construct the memory through an array of intersecting busses, comprised of row and column busses. The intersection of a row and of a column defines a memory location to the bit level. Association of the terms, row and column with particular structure is basically arbitrary; the rows are constructed as electrode plating to serve as gates respectively adjacent intersections with a plurality of columns, which are constituted as elongated zones establishing internal, diffusion zone type electrodes particularly at the intersections. Each such column zone cooperates with a juxtaposed, similar zone defining a second diffusion zone electrode, spaced therefrom to permit establishing of a gate controlled conduction channel. These second zones will be termed, reference zones.

The thickness dimension of the oxide layer between gate plating of a row and an elemental region between a column zone and the closest reference electrode zone determines whether or not a FET is in fact established in the memory location to the bit level at that intersection. A FET is not established in an intersection, when the electrode plating of a row passes across a column while being separated from the adjoining region closest to a reference electrode zone at full oxide layer thickness.

An addressed intersection causes conduction of an FET, if established, resulting in collapse of potential difference between column zone and adjacent reference zone, which is sensed on the column zone. No such collapse is possible if there is no FET at an addressed intersection. The output circuit senses this change in potential on a column but this is not part of the present invention.

During first phases of operation a row and one or several columns are biased for conduction of any FET on any of the intersections of the row and of any of the accessed columns. The selection of row and columns is made in response to addressing signals. The selected row is coupled to an input line receiving first phase potential without providing a return path to substrate potential, the non-selected rows are coupled to or maintained at substrate potential.

The selected columns are biased, for example, through coupling to that input line, to precharged nodes in a manner which permits only conduction of a FET between one input line and a node. In the preferred embodiment, an addressed column is coupled to a node which will discharge in case the column intersects with a gated-on row and there is a FET in the intersection. There are a plurality of such output nodes, and their charge state during addressing represents the result of read-out. Any non-addressed column is decoupled from such a node that may discharge in case of accessing that column. During second phases of operation, interspaced with the first phases, rows and columns are uniformly prepared; preferably all rows are discharged to substrate potential, while the output nodes are charged and respectively coupled to all columns for selective decoupling of all nonselected columns at the next first phase.

The rows are addressed through serially connected decoder FET's, each individually controlled through address responsive, decoder drivers constructed as inverters. An inverter may include field effect structure wherein a single channel is coupled to two separated drain electrodes and to a source electrode connected to receive substrate potential. The gate of that device receives an addressing signal. The two drain electrodes are serially connected respectively to two FET's, a first one thereof connected in turn to receive first phase signals as drain bias, the other FET connects serially to a node that is charged with each second phase signal. The latter node controls the gate of the first one of the two FET's and receives capacitively a voltage augmenting the gate controlling potential drop for each first phase signal.

The first mentioned drain electrode controls the gate of a decoder FET, which is serially connected to others and to a row-gate of the memory. If the addressing signal holds the aforementioned field effect structure in the off state, the first mentioned drain electrode is at floating potential but the capacitively augmented gate control of the first FET drops the potential of the first drain electrode to full negative potential of the first phase signal for, in turn, rendering the decoder FET conductive at a steep rate and possibly at saturation. This way the addressed row-gate of the memory receives full negative first phase potential.

Nowhere in the circuit is there a conductive path between either of the sources of the two phase signals and substrate potential. Wherever a source path may exist to the substrate potential, the drain is established by a node and that node can be charged only during a different phase of operation. Capacitive coupling between a node and source of phase signal enhances control of a transistor that has its gate connected to that node if that transistor controls the gate of another one. This way, output levels are always sufficient to control, ultimately, a memory FET at least for near saturation conduction.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE illustrates somewhat schematically circuit and block diagram of salient features of a memory constructed, in accordance with the preferred embodiment of the invention. The figure illustrates a plurality of address-decoder drivers 10, one of them shown in detail and operating in parallel with others of similar type to operate a decoder 30. Decoder drivers 10 are under control of externally developed addressing signals A, B, C etc.; the driver illustrated in detail is under control of addressing signal A. Decoder 30 controls an addressing bus 31 for read-addressing of one or more locations in a memory 40, which is, for example, a read-only memory. There being a plurality of such busses (31, 31' etc.) and a corresponding plurality of decoders, 30, 30' etc., responding to different combinations of addressing signals.

The memory has individual locations to the bit level, there being a plurality of locations on and along bus 31. These locations are defined specifically by intersections with busses such as 41, 41', 41'' etc. Thus, the plurality of busses such as 31, 31' etc., and the plurality of busses such as 41, 41', 41'' etc., define an array or matrix if intersections, however, intersecting busses remain insulated from each other. It is convenient to define the locations on bus 31 (and others) as a row of the matrix, and the locations on bus 41 (and others) are a column of the matrix accordingly. The memory includes a column addressing circuit 50, which is under control of addressing signals, such as X, Y, which are also externally developed. Finally, there is a memory output circuit 60, receiving and processing signals that have been read from memory. Circuit 60 may be in parts on the same chip.

The circuit illustrated is presumed to be on an integrated circuit chip, wherein the active elements are of the metal oxide semi-conductor type. For reasons of conveniently explaining the invention, it is assumed that the transistors employed in that circuit are P channel, MOS, insulated gate field effect transistors. The principles are equally applicable to other structures, particularly to structures using N channel MOS circuits. Also, it is presumed that the field effect transistors are operated in the enhancement mode.

Furthermore, as stated above, all transistors employed in the circuit are of minimum size, each of them exhibiting minimum impedance when conductive. That is to say the transistors are as small as feasible to obtain field effect operation in a conductive channel by operation of an insulated gate, and they are as small as practicable for making such an IC chip with the prevailing techniques. Thus, wherever there are two or more transistors connected in series to each other within the circuit and across two sources of operating potential, they do not have to have particular impedance ratios in the conductive state. This is particularly so because the circuit is designed and operated so that there is never a conductive path between two sources of different potentials. Commensurate therewith, the driver-decoder and memory accessing system, does not require d.c. bias, thus, reducing power drain by the system.

The entire system is under control of two interspaced trains of clock pulses, 01 and 02. It is significant that only two clock phases are needed, as that enhances the operational speed. Each clock pulse needs to be only as wide as necessary to obtain the required control operation, taking into account finite rise and fall time; two succeeding pulses of different trains need to be spaced only to prevent overlap of operation in different parts of the IC-chip, and taking into account that operational tolerances may cause phase deviations of individual pulses. Two sequential pulses of different trains may thus follow each other in immediate sequence, which is to mean that they are spaced so close that an operational phase between them could not be established.

The principal operational decoder and memory accessing clock phase is 01 during which phase the outputs of the several decoders are presented on the memory busses for control thereof, so as to enable one row and one or several columns. Phase 02 serves as preparatory, cancellation, erasing and precharge phase, to obtain a particular uniform "codeless" operational state throughout the system. The system cycles through these phases to obtain sequential readout of data.

Turning now to details, the memory proper of the IC-chip is presumed to be of the "read only" type. Within the MOS IC-chip there are established columns of particular diffusion zones in the semi-conductor body on a substrate. One of the columns is constituted by bus 41, others are denoted 41', 41'' etc. Adjacent such column/zone and bus, and operatively shared by a pair of column busses, such as 41 and 41', there are diffusion zones, such as 44, 44' etc., which are to receive ground or substrate potential. Zones 41, 41' etc. are spaced from the respective closest reference zone 44, 44' etc. at a distance equal to the minimum distance required between zones in an MOS device to establish an insulated gate controllable channel between them. The column zones, such as 41, are to serve as drain electrodes, the grounded column zones are to serve as source electrodes for FET's constituting storage cells.

Strictly speaking, the matrix columns are established by the elongated regions in between a column zone, such as 41, 41' etc., not connected to receive substrate potential directly, and an adjacent reference zone at substrate potential, such as 44, 44' etc. The matrix rows, such as 31, 31' etc., are established as electrode platings on the oxide above the region traversed by the matrix columns. Each intersection between a row and a column defines a memory location to the bit level which is specifically established by an elemental region of a matrix column above which crosses the electrode plating of a row. Two cases are to be distinguished; (a) the intersection is developed as a memory FET (such as 45), (b) the intersection is not developed as a FET. It may (arbitrarily) be assumed that an established memory FET represents permanent storage of a bit of value "1" in that location; absence of a completed FET in an intersection represents storage of a bit of value "0."

A memory location FET is specifically established in the IC-MOS chip by (1) thinning the oxide layer of the MOS-IC-chip above a limited region between the two zones, such as 41 and 44 and (2) running electrode plating of a row above that thinned region as a gate.

Hence, a FET channel is established in a particular limited region between zones 41 and 44, underneath the area of thinned oxide. The gate defining electrode plating pertains to a memory addressing bus of the rows, such as 31.

Such an electrode plating, establishing a row, passes across all of the columns, and follows particular the contour of an indentation, where the oxide layer has been thinned to establish a FET at such an intersection. A storage location with value "zero" is established by absence of thinning the oxide layer in the intersection, so that a row-establishing plating has distance from the elemental zone underneath too large to establish gate control, thus, failing to establish a FET at that matrix intersection.

During operation, and in response to particular column addressing signals, column driver circuit 50 causes a negative going drain voltage to be applied to an addressed column zone during pulse time 01. Concurrently, a row receives negative gate voltage. If a memory location FET is on the intersection between that gate-row and that column, this FET is rendered conductive, the column potential drops to substrate potential which potential drop is sensed by output circuit 60. If a memory location FET is not in that intersection, a negative signal is applied by the column to the output circuit 60.

A memory gating electrode, such as 31, is addressed through the particular decoder 30, and responds to a particular combination of addressing signals A or $\bar{A}$, B or $\bar{B}$, C or $\bar{C}$. There are other decoders, such as 30', responding to other combinations of addressing signals. For purposes of illustration, a three bit addressing code (A, B, C) is presumed so that at most eight different memory gates can be individually addressed. There are three transistors 32, 33 and 34 included in decoder 30, and they are connected in series to each other, and to the source of phase signals 01. Transistors 32, 33 and 34 each have a gate that is connected to receive a phase controlled addressing signal.

A memory gating electrode, such as 31, is additionally under control of a transistor 35, connected serially thereto as well as to ground or substrate. The gate of transistor 35 is under control of phase signal 02. As a consequence, any accumulated gating charge in gating bus 31, relative to substrate and to any of the column zones, is discharged to ground or substrate during each phase 02. This operation is part of the phase 02-preparatory steps, preventing undesired memory gating as during 02 all columns are subject to precharge as will be described below. Also, during the next phase 01, non-addressed rows should not provide parasitic gating operation.

The particular memory gating bus 31 is taken negative when all three transistors 32, 33 and 34 are rendered conductive during a phase 01. Should this occur, all memory FET's, having a gate connected thereto, are rendered conductive, but will conduct only, if concurrently thereto the associated column is biased negatively also.

In the particular case illustrated, it is presumed that the three decoder transistors 32, 33, 34 are rendered conductive for an address of A=B=C=0. This, of course, is an entirely arbitrary selection from among the available addressing signals, A or $\bar{A}$, B or $\bar{B}$, C or $\bar{C}$.

The respective gates of the decoder FET's are controlled by inverter drivers 10; the development of the particular gating signals for these decoder FET's by these inverter drivers will be developed next.

The driver inverter 10, illustrated in greater detail, comprises a first, essentially internal node N1 established by an isolated diffusion zone of particular conductivity with capacitance relative to substrate. That zone establishes also a source electrode of a FET 11 and a drain electrode of a FET 12. Node N1 is also connected to a gate electrode of a FET 13, as well as to one side of a capacitor 15. The second node of the inverter driver is an output node N2 established by the source electrode of FET 13 and by a first drain electrode 21 of a particular device 20.

Device 20 has source electrode means 22, shown in two parts, **22*a* and 22*b*, which are connected to ground or substrate. The device 20 has a second drain electrode 23 which is distinct and separated from drain electrode 21. Gate electrode means of device 20 is shown also in two parts, 24*a* and 24*b***. The device may be constructed in that a single channel extends from *a* source electrode defining diffusion zone to two different drain electrodes, and that single channel may then be controlled as to conduction by a single gate. Thus, source electrode means **22*a* and 22*b* may actually be a single source electrode, and/or gate means 24*a*, 24*b*, may constitute a single gate. The two drain electrodes 21 and 23 are decoupled from each other when the gate voltage does not permit conduction. The drawing shows the functional equivalent of that device as two separate FET's, but inverter 10', to be described below, illustrates the device as a single three-main electrode unit 20'**.

Drain electrode 23 connects to (or is integrated with) the source electrode of FET 12. Drain electrode 21 connects to or is integrated with the source electrode of FET 13. The drain electrode of FET 13, the gate of FET 12, and the other side of capacitor 15 are connected to receive clock pulses 01. Gate and drain electrodes of FET 11 are connected to receive clock pulse 02. The gates **24*a*, 24*b* receive the addressing signal A as logic signal to be phased and amplified etc. to obtain memory addressing. In particular, signal A is an addressing bit derived from an address register that may be external to the chip and applied to the inverter via an input circuit 28** as described, for example, in copending application Ser. No. 7,768 (filed Feb. 2, 1970).

The inverting and phasing amplifier 10 operates as follows: As stated above, phase signal 02 is a preparatory signal, and as to inverter 10, it charges node N1 through FET 11. That node is inherently decoupled at that time from any other line, particularly from ground or substrate, as FET's 12 is definitely non-conductive during phase times 02. Addressing signal A may exist already when node N1 is charged. It is important only that signal A has established a particular signal level by the next phase time 01; signal A may change at any time after a signal 01 has decayed, particularly, for example, during a pulse time 02. The assembly 20, as controlled by signal A, is decoupled from 02-operated transistor 11, because transistor 12 is positively non-conductive during 02 as stated.

Assuming that signal A is taken negative at any time after a signal 01, then device 20 is rendered conductive. Node N2 is now discharged to ground or substrate potential; similar potential is also applied to the source electrodes of transistors 12 and 13. As 01 is taken negative, node N1 discharges to ground through transistor 12 and through the drain-source path 23–22*a*. Thus, node N2 remains decoupled from phase line 01 and is coupled, instead, to ground. It follows that decoder transistor 32 is not rendered conductive and memory gate bus and electrode 31 remains unenergized.

It is significant that no direct current path exists between phase line 01 and ground anywhere in the circuit, particularly due to non-conduction of transistor 13.

Assuming that signal A is at ground or substrate, potential level (in logic terms $A=0$, $\bar{A}=1$), device 20 remains non-conductive. Node N1 is pre-charged as before during 02. As transistor 12 is rendered conductive by signal 01, node N1 does not discharge as the source electrode of that transistor has negative potential. On the other hand, negative going signal 01, as applied to capacitor 15, causes the voltage of node N1, i.e., the gate potential of transistor 13 to drop further, so that transistor 13 is turned on at a steep rate. Accordingly, negative going signal 01 is, so to speak, gated-through transistor 13 at a high rate of conduction thereof, to turn transistor 32 on. This turn-on signal is essentially the signal 01, with little attenuation through transistor 13, so that transistor 32 is gated-on to a high degree of conduction, possibly to saturation. This is essentially due to the operation of capacitor 15, augmenting the turn-on signal as provided for transistor 13 by the undischarged and isolated node N1.

Concurrently with gating-on, the drain electrode of FET 32 receives also signal 01. Decoder FET's 33 and 34 may or may not be rendered conductive, depending upon the level of signals B and C. Alternatively, another decoder receiving signal $\bar{A}$01 from the particular inverter 10, may respond. In case all decoder transistors on gating bus 31 are rendered conductive by analogous operation of inverter drivers controlling the three transistors 32, 33, 34, each of them is rendered conductive by a high negative voltage so that signal 01 is applied with little attenuation to all gates on bus 31.

Node N2 may retain some charge after 01 has decayed, which is not important, as (1) line 31 will discharge during the next pulse 02, (2) none of the transistors 32, 33, 34, can conduct as long as 01 is not negative and (3) is $\bar{A} \rightarrow A$, node N2 discharges through the path 21–22*b* or (4) if $\bar{A}=1$ remains, the transistor 32 has to turn on again with the next signal 01.

The signals A, B etc. are derived directly from an external source, and the inverter 10 illustrated in detail, forms $\bar{A}$. The signal A itself is also needed directly in the memory accessing system and its amplification is required due to required signal fan-out. Therefor, a second inverter 10' is serially coupled to the one illustrated. In essence, the node N2 provides the output $\bar{A}$ as input for inverter 10' constructed similarly as inverter 10. The device 20' therein is shown as a compact unit to demonstrate singleness of structure of source electrode 22' and gate 24'. Details of device 20' are disclosed in copending application, Ser. No. 7,767. Inverter 10' controls a decoder FET of decoder 31' and necessarily in opposition to control a decoder FET 32.

There is a coupling circuit comprising a 01-gated FET 26 serially coupling node N2 to gate 24', to control the gate 24' by signal $\bar{A}$01. Additionally, gate 24' can be connected to ground by an A-signal gated FET 27. This latter transistor discharges the node at gate 24' independently from discharge of node N2 when signal A goes negative.

Turning now to the column addressing circuit 50, the illustrated circuit is representative of the following organization aspect. The columns are individually addressable, subject to a column addressing code. In the illustrated example, there are two column addressing code bits, X and Y; this number is quite arbitrary, there may be more, there may be less. Generally, the continuum of column address represents the number of different sets of columns that can be addressed. In case of a two bit column addressing code, there are four different sets of columns.

Independently therefrom, each column address code may cause accessing of one or more different columns. Thus, the number of columns per set represents the format of a, possibly, multi-bit data word that is being read during an access step. In the present case, a two bit word is presumed; again, this is arbitrary and freely selectible. Moreover, there is no inherent relation between the number of bits per word (columns concurrently addressed) and the number of sets of columns addressable through different column address codes.

The word format determines the number of read-out lines; accordingly, there are two read-out lines 61 and 62 feeding the output circuit 60. These read-out lines include two nodes NC1 and NC2 established among others, by particular capacitance (51 and 52), both taken relative to phase line 01 for reasons below. Each node is operatively connectible to several different column zones. Particularly, there are as many different columns connectible to each of the nodes NC1, NC2, as there are different sets of individually addressable columns; in the present case there are four.

The connection between a node, such as NC1, to four different columns runs through decoder FET's. The decoder circuitry is repeated and operated in parallel as to connection between node NC2 and four other columns. A column, such as 41, is under control of a plurality of column decoder transistors, such as series-connected FET's 46 and 47, for connecting column 41 to node NC1 when conductive. The column 41' connects to the same node NC1 also via FET 46, but additionally, via FET 47'' other decoder FET's connect the node NC1 to other columns.

Nodes NC1 and NC2 are respectively connected to FET's 48 and 49 having drain and gate electrodes connected to receive signal 02, so that these nodes NC1 and NC2 are charged with each preparatory phase 02 signal. Capacitors 51 and 52 are instrumental here to obtain sufficient charge. It should be noted that signal lines receiving signal 01 are at substrate potential particularly during 02 phases.

A column decoder driver circuit controlling, for example, the gate of decoder FET 46 is shown representatively, particularly for responding to a column addressing signal X. This particular driver circuit forms signal X and its output is passed not only to the gate of FET 46 but also to other decoder FET's receiving signal $\overline{X}$. These include a second plurality of decoder FET's operating in parallel for connection to the second node, NC2. One of these FET's is FET 46′ governing column 41″ and others. The FET 46′ is connected in series with a FET 47′, receiving the same addressing signal as FET 47.

All these various column decoder FET's are driven by circuits included in circuit 50. One driver circuit is illustrated in detail; it includes a FET 53 having interconnected drain and gate electrodes, and having source electrode for establishing a node N3 together with the gate of column decoder transistors 46 and 46′ and others. A capacitor 54 augments the capacity of the node. Node N3 is charged also by and during 02. Capacitor 54 is taken relative to the signal line for 01 which is at substrate potential during 02. There are corresponding nodes, such as N3 included in all of the other column decoder drivers, and they are likewise charged upon 02.

Thus, it may be observed, that all column decoder FET's, such as 46, 46′, 47, 47′, and others, are rendered conductive during 02 as preparatory step for column addressing. As output nodes NC1 and NC2 are also charged during 02, all columns are preparatorily biased negatively during 02.

Turning back to the particular column decoder driver, the circuit includes a transistor 55 having its source connected to ground and having its gate connected to receive the addressing signal X. The drain of FET 55 is connected to node N3 via a FET 56 having its gate connected to receive phase signal 01. This FET 56 separates address signal operated FET 55 from the node N3 when charged during 02. Again, one can see that there is no current path established to substrate potential from any of the phase lines for signals 01 and 02.

As a general rule, a column to be accessed during memory read phase time 01 requires that it be coupled to its associated node (NC1 or NC2). In other words, only one column per output node must respectively remain conductively connected thereto. Thus, the column decoder network operates to decouple all columns from a node (NC1 or NC2), except one. Therefor, the particular column 41 (and 41‴) or 41″, requires for addressing that transistor 55 (and others) is not rendered conductive. Assuming, column 41 is not to be addressed, for example, because $\overline{X}=0$. As signal X is taken negative (which represents $X = 1$) and at least by the time of a signal 01, node N3 rapidly discharges through serially conductive FET's 55 and 56. This discharge is aided by capacitive coupling of negatively charged node N3 to the line receiving the negative signal 01. Thus, transistors 46 and 46′ are rendered non-conductive, so that node NC1 is decoupled from column bus 41, and node NC2 is decoupled from column 41′.

In case $\overline{X} = 1$, FET 55 is not rendered conductive and node N3 does not have a discharge path to ground, even though FET 56 is conductive upon 01. Accordingly, decoder FET's 46 and 46′ remain conductive during phase 01. Decoder FET's 47 and 47′ are controlled by a similar inverter which is presumed to receive signal Y. Thus, FET's 47, 47′, remain conductive on $\overline{Y}=1$. Consequently, upon $\overline{X}\cdot\overline{Y}=1$ both FET's 46 and 47 (and 46′ and 47′) remain conductive so that column 41 remains coupled to node NC1 and negatively charged as pre-requisite of accessing any memory location on that column. All other columns that have been in connection with node NC1 are disconnected therefrom because one or both decoder FET's respectively connected in series with them was rendered non-conductive. On the other hand, one other column remains connected to node NC2 due to parallel operation of a second decoder (FET's 46′, 47′) responding to $\overline{X}\cdot\overline{Y}$.

It follows from the foregoing that during phase 02, as a preparatory step, all column busses, such as 41, 41′, 41″ etc., are biased negatively due to (1) charging of the respective node, NC1 and NC2, and (2) due to rendering all column decoder transistors (such as 46, 47 etc.) conductive. Also during 02, all memory location gates, such as bus 31, 31′ and others, are discharged and hold substrate potential.

During next pulse 01, one memory gate bus of a row of the matrix is rendered conductive, and two columns are not decoupled respectively from nodes NC1 and NC2. Accordingly, two memory locations are accessed, in the two intersections of the two columns and of the tow. For example, gate bus 31 and columns 41 and 44‴ may have become negatively biased; the gate 31 connects through low impedance coupling by conductive decoder FET's 32, 33, 34 to the line of phase signal 01, the columns 41 and 44‴ connect through low impedance of conductive decoder FET's to nodes NC1 and NC2 respectively. The FET 45 at the intersection of column 41 and of row 31 is now rendered conductive and discharges output node NC1. There is no FET at the intersection of column 44‴ and of row 31, so that output node NC2 is not discharged. The state of the nodes NC1 and NC2 is sensed by output circuit 60 via input lines 61 and 62 and processed accordingly.

As to the particular column addressing, it should be observed that the negative voltages of nodes NC1 and NC2 are augmented (at first) due to capacitive coupling to line 01 (capacitors 51 and 52). Moreover, signal 01 is capacitive coupled to the gates of those column decoder FET's which remain conductive. This has the following effect.

If, as described, a node, such as NC1, discharges through an accessed memory location FET (such as 45), capacitive feedback coupling of the decoder FET's (such as 46) to the gate may tend to reduce conduction thereof due to depletion of the charge in the node NC1. The capacitive connection (54) of the gate of column decoder FET, such as 46, to the signal line receiving 01 inhibits this reduction in conductance through the decoder FET.

The invention is not limited to the embodiments described above but all changes and modifications thereof not constituting departures from the spirit and scope of the invention are intended to be included.

We claim:

1. In a digital data, integrated circuit memory, using field effect components or MOS type and structure there being sources of alternating first and second phase signals, the combination comprising:

a. a plurality of decoder drivers, each including first means at substrate potential, first and second drain electrodes at the channel means and separated and insulated from each other and from the source electrode means except for conduction through the channel means, and gate electrode means disposed for controlling conduction through the channel means, therebeing means to apply an addressing signal to the gate electrode means;

a first minimum size FET transistor connected with drain and source path between the first drain electrode and the first phase signal source;

a second minimum size FET transistor connected between the second phase signal and the gate of the first transistor and establishing therewith a node;

a third minimum size FET transistor connected with source drain path between the second drain electrode and second node, and having its gate connected to the first signal source; a capacitor connected to the node, further connected to receive signal derived from the first phase signal source;

b. a plurality of decoder transistors including a fourth minimum size FET transistor having its gate connected to said first drain electrode or one of the drivers of the plurality; and operated for conduction during first phase signal;

c. a plurality of memory locations including at least one FET having its gate connected to said fourth minimum size FET to be rendered conductive in dependence upon the state of conduction of the fourth transistor during a first phase signal; and circuit means connected to derive a read out signal from the memory locations in dependence upon the states of conductions said FET's therein.

2. In a memory as in claim 1, the fourth transistor connected in series with electrode plating means serving as gates for a plurality of FET's pertaining to different memory locations, each FET of the latter plurality connected to a different one of a plurality of sources of drain potential and means connected to control the potential of the source in dependence upon the first phase signal and selectively for each of the sources.

3. In a memory as in claim 2, the sources of drain potential being nodes, connected to be charged in response to each second phase signal, the circuit means connected to sense the charge state of the latter nodes during each first phase signal.

4. In a memory as in claim 1, the decoder transistors of the plurality connected in series to each other and to the source of first phase signals, each decoder transistor connected with its gate to one of the decoder driver, to operate a gating bus for the plurality of memory locations.

5. In a memory as in claim 1, including a second plurality of decoder transistors including a fifths transistor operated for conduction during first phase signals further including a second plurality of decoder drivers each constructed similar to the drivers of the first plurality and having their respective gate electrode means respectively connected to the first drain electrode of one of the drivers of the first plurality, and having its first drain electrode connected to the fifths transistor of the second plurality of decoder transistor, the fifths transistor rendered conductive when the fourth transistor is non-conductive during first phase signals and vice versa.

6. In a read only integrated circuit memory using field effect components of MOS type and structure, there being sources of alternating first and second phase signals in immediate sequence for clocking and phasing operation of the memory, the combination comprising a plurality of gate electrodes establishing rows of a matrix;

a plurality of drain electrode establishing zones defining columns of a matrix, intersecting the rows of the matrix;

source electrode means in physical association with each drain electrode means of the plurality, extending alongside thereof and provided to establish FET's respectively in some of said intersections, and in representation of bits of a first value to be stored in those intersections, absence of a FET in the remaining intersections establishing bits of opposite value therein;

first means for establishing substrate potential in each of the rows during second phase signals;

second means for establishing at least one node and including means for charging the node in isolation from substrate potential during second phase signals;

third means for coupling a selected one of the columns to the node during second phase signals;

fourth means for providing gating potential in a selected one of the rows during first phase signals, to obtain discharge of the node if a FET is established in the intersection of the selected row and of the selected column; and fifth means for providing substrate potential directly to all of said source electrode means.

7. In a read-only memory as in claim 6, the third means operated to couple the node to a plurality of the columns from which the selection is taken during and in response to a second phase signal, and to discouple the node from the non-selected columns in response to the succeeding first signal.

8. In a read-only memory as in claim 7, the third means including a plurality of decoder FET's serially connected between the node and a column of the plurality, means establishing a second node and connected to be charged during second phase signals, a decoder FET of the plurality having its gate controlled in response to the charge on the second node;

a capacitor connected to the gate to apply thereto the first phase signal to augment gating control for the decoder FET by the second node as charged; and means to selectively discharge or inhibit discharge of the second node during and in response to first phase signals.

9. In a read-only memory as in claim 6, the fourth means including a plurality of decoder FET's, serially connected between the source of the first phase signals and a row of the plurality, a decoder FET of the plurality having its gate serially connected to a control FET which, in turn, is connected to the source of first phase signals;

means establishing a second node connected to be charged in response to second phase signals, the gate of the control FET connected to that second node, a capacitor connected between the second node and the source of first phase signals; and means responsive to an addressing signal to selectively discharge or inhibit discharge of the second node during and in response to first phase signals.

10. In an integrated circuit memory with field effect components of the insulated gate type, there being sources to provide trains of alternating first and second phase pulses in immediate sequence, the memory responding to addressing signals, the combination comprising:

means establishing a plurality of nodes connected to be periodically charged by the second phase pulses;

first plurality of FET means each serially connected between a source of substrate potential and one of the plurality of nodes, each further connected to be responsive to an addressing signal and a first phase pulse to selectively discharge or inhibit discharge of the node;

second plurality of FET means each connected to be controlled in response to first phase pulses, respectively to the charge state of one of the nodes and to the respective addressing signal, to provide a plurality of output signals; and circuit means in the integrated circuit, including a plurality of serially interconnected decoder FET's, each having its gate connected respectively to receive one of said output signals so as to provide memory addressing during first phase signals in dependence upon the output signal as controlled by the second FET means.

11. In a memory as in claim 10, the state of conduction of the decoder FET's of the plurality controlling the potential of an electrode means serving as plurality of gates respectively for a plurality of memory element FET's, to be rendered selectively conductive during first phase signals, the gates conductively decoupled from substrate potential during first phase signals, at least when receiving potential for selective conductivity control of memory FET's of the plurality.

12. In a memory as in claim 11, each of the FET means of the second plurality including a FET connected with its source-drain channel serially to the source of first phase signals to provide the output signal and having its gate connected to the node, there being a capacitor connected between the node and the source of first phase signals.

13. In an integrated circuit memory with field effect components of the insulated gate type, there being sources to provide trains of alternating first and second phase pulses in immediate sequence, the memory responding to addressing signals, the combination comprising:

a plurality of memory locations including at least one FET and having its gate connected to receive gating potential for accessing the location having the FET;

a plurality of decoder FET's serially connected to each other and between the gate of the memory FET and the source of first phase signals;

a control circuit for each decoder FET, and including a control FET having its drain-source path connected between the source of first phase signals and the gate of the respective decoder FET;

means establishing a node connected to the gate of the control FET;

a capacitor connected between the node and the source of first phase signals;

means connected for charging the node during and in response to second phase signals; and means connected for selectively charging and discharging the node during and in response to first phase signals, the selectivity being under control of a memory addressing signal, the node when remaining charged during first phase signals rendering the control FET conductive, which, in turn, renders the respective decoder FET conductive.

14. In a memory as in claim 13, the memory FET established between first and second zones underneath its gate defined as electrode plating and as connected to the decoder FET's, the first zone connected to receive substrate potential, the second zone selectively connected to an output node during and in response to first phase signals, the output node connected to be charged during each second phase signal.

* * * * *